Figure 1:
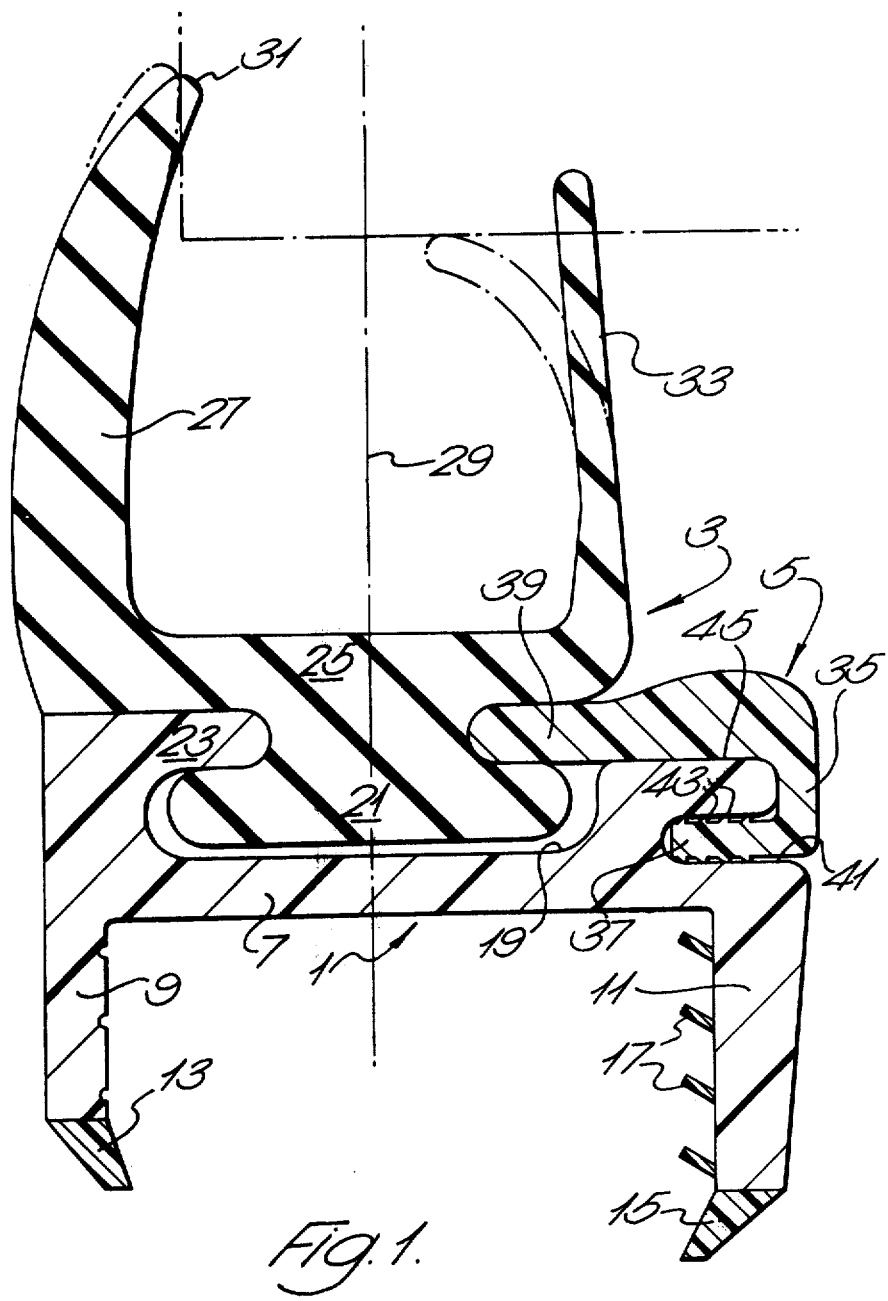

United States Patent [19]

Oakley et al.

[11] 4,119,325
[45] Oct. 10, 1978

[54] THREE-PART SEAL CONSTRUCTION

[75] Inventors: John Oakley, Kempston; Derrick Ruffell, Stevenage, both of England

[73] Assignee: Schlegel (UK) Limited, Leeds, England

[21] Appl. No.: 800,525

[22] Filed: May 25, 1977

[51] Int. Cl.² .................. F16J 15/10; E06B 7/16
[52] U.S. Cl. .................. 277/207 R; 49/488; 49/490; 49/493; 49/495; 296/93
[58] Field of Search .......... 49/490, 493, 495, 488; 296/93; 277/207 R, 226

[56] References Cited

U.S. PATENT DOCUMENTS

| 1,877,729 | 9/1932 | Chaffee | 49/495 X |
|---|---|---|---|
| 2,329,791 | 9/1943 | Sevison | 49/488 |
| 2,475,131 | 7/1949 | Edwards et al. | 49/488 X |
| 2,772,915 | 12/1956 | Renno | 296/93 X |
| 2,912,727 | 11/1959 | Sehn | 49/495 X |
| 3,161,925 | 12/1964 | Bertolini | 49/488 X |
| 3,323,256 | 6/1967 | Reahard et al. | 49/493 X |
| 3,694,985 | 10/1972 | Spaiches | 49/488 X |
| 3,886,686 | 6/1975 | Urbanick | 49/488 |
| 4,001,974 | 1/1977 | Wright | 49/488 |
| 4,015,368 | 4/1977 | Court et al. | 49/488 |

FOREIGN PATENT DOCUMENTS

| 152,419 | 7/1953 | Australia | 296/93 |
|---|---|---|---|
| 538,531 | 6/1955 | Belgium | 49/490 |
| 754,863 | 3/1967 | Canada | 49/488 |
| 1,465,492 | 12/1966 | France | 296/93 |
| 683,567 | 12/1952 | United Kingdom | 296/93 |
| 733,688 | 7/1955 | United Kingdom | 49/488 |

Primary Examiner—Robert S. Ward, Jr.
Attorney, Agent, or Firm—Cumpston & Shaw

[57] ABSTRACT

A seal construction for a container door which has a first resiliently deformable part of predetermined generally channel sectioned shape for application to the edge portions of a container door to preclude the passage of moisture to the door edges, and a second part connected to the first part and having at least one resiliently deformable sealing arm for sealing engagement with a portion of the container around the door opening. In the preferred arrangement, the first and second parts are separate and a third part is provided to connect the two parts together, and in one arrangement the tips of the arms of the channel shaped part are of a softer material than the remainder of the seal. In a second construction, the tip of one of said arms is joined to the remainder of the arm by a softer portion and in this second construction the whole seal may be a one-piece extrusion.

20 Claims, 2 Drawing Figures

THREE-PART SEAL CONSTRUCTION

This invention relates to a door seal construction specifically designed for use on cargo container doors, but which could be put to many other uses.

Normally, cargo containers have very large doors at one or both ends of the container and these are traditionally made of multi-ply wood, and in order to prevent dust from entering the interior of the container and so as to keep the container generally airtight and watertight, a seal is normally provided around the periphery of the door (or doors) on the end of the container for engagement with the container around the door opening. This seal, as well as sealing the interior of the container when the door is closed, should also be capable of sealing the edges of the door to which it is applied, from the elements and in particular, capable of preventing moisture from reaching the edges of the door. Needless to say, if water reaches the end faces of the plies making up the door, the door will quickly deteriorate.

Various proposals have been put forward to meet the above requirements and one proposal is to provide a dual durometer one-piece H-section seal which does work satisfactorily. The problem with this seal, however, is that if the portion of the seal for sealing the container, or for that matter the portion for sealing the edge of the door, becomes damaged then the whole seal has to be replaced. An alternative proposal has been to provide an extruded flexible container seal portion which can be attached to an extruded metal portion which is fitted to the edge of the door to seal the door. This seal, however, suffers from the disadvantage that the extruded metal portion is rigid and cannot accommodate tolerances in door thickness and therefore it is difficult to provide an entirely watertight seal with the door. Also, metal extrusions are expensive and, being rigid, are awkward to fix to the door and to handle prior to fitting.

The door seal construction of the present invention has been evolved to overcome the problems which have been experienced with prior proposed seals.

According to the present invention, we provide a container door seal construction which is formed in at least two inter-connectable parts, a first part being resiliently deformable and of a predetermined generally channel sectioned shape for application to the edge portions of a container door so that when fitted to the door it will form a seal with said edge portions to preclude the passage of moisture to the door edges, and a second part having a base for connection to the first part and at least one resiliently deformable sealing arm upstanding from an edge region of said base for sealing engagement with a portion of the container around the door opening, and means to connect said two parts together.

Preferably, the first part is extruded from a resiliently deformable plastics material and is of generally rectangular U-shaped cross-section, the arms of the U being inwardly directed at their tips to form seals with peripheral edge portions of the front and rear faces of the door.

Preferably, the plastics extrusion is a dual durometer extrusion with said tips being of a softer material than the remainder of the extrusion. Preferably, at least one of the arms of the U is provided with one or more gripper fins extending inwardly from the inner face of the arm towards the base of the U so as to assist said portion automatically to grip on the container door.

Preferably, there are a plurality of said gripper fins and these may be of softer material than the remainder of said part, e.g. of the same soft material as said tips. The outer face of the base of the U of the first part may be specially formed for mating engagement with the base of the second part and in one construction may be cut away with an overhang, so that the overhanging part overlies part of the base of the second part.

Preferably, the second part is also extruded from a resiliently deformable material. This material is preferably rubber. Preferably, the second part is also generally of U-shaped cross-section with a second sealing arm providing the second arm of the U, the second arm preferably being shorter than the first arm and more easily deformed than the first arm. Preferably, the base has a T-sectioned projection on its outer face, part of the crossbar of the T engaging beneath the overhang on the first part.

Although it is envisaged that the first part of the seal construction could be connected to the second part in many different ways and could in fact form a snap-fit connection with the first part, it is preferred to make use of a third seal part as the means to connect the first and second parts together. This third part can then act in conjunction with the mating arrangement between the first and second parts. In a preferred construction the third part comprises an extrusion, part of which engages with the first part and another part of which engages with the second part. Preferably, this extrusion is resiliently deformable, e.g. of a plastics material, and of generally U-shaped cross-section with one arm of the U engaging in a groove extending lengthwise of the first part and a second arm engaging beneath part of the crossbar of the T-shaped projection of the second part. Preferably, therefore, the second arm is longer than the first arm. The first arm, or for that matter the second arm, may be provided with outwardly extending gripper fins on one or both of its faces to improve the grip of the arm with its appropriate seal part. It is envisaged that the third part could be a dual durometer extrusion with at least the gripper fins or some of them formed of a softer material than the remainder of the third part.

In an alternative construction, the first seal part is so constructed that, instead of having soft tips to its arms, a tip portion of one of the arms is connected to the remainder of the arm by a portion formed of a softer material than the remainder of the arm.

Preferably, the tip portion has an inner surface which is inclined inwardly towards the opposite arm of the pair so that the portion can take up manufacturing tolerances. If desired, the remainder of the arm having the tip portion can be hollow.

Two preferred embodiments of container door seal are now described by way of example with reference to the accompanying drawings, which are sectional views through the two seals.

Referring to FIG. 1, the seal construction is comprised of a first part 1, a second part 3 and a third part 5. The first part 1 is of generally rectangular U-shaped cross-section with a base 7 and an external upstanding arm 9 and an internal upstanding arm 11. The distance between the inner faces of the arms 9 and 11 is predetermined so as to be slightly greater than the average thickness of an edge portion of a container door to which it is to be applied and the arm 11 is arranged to be located against the inside face of the door. The part 1 is formed by a dual durometer plastics extrusion process and the base 7 and main parts of the arms 9 and 11 are formed of resiliently deformable plastics material, whereas the tips 13 and 15 of the two arms are formed of a softer plastics material.

As can be seen, the two arms tips 13 and 15 have their inner edges at least inwardly directed relative to the remainder of the inner edges of the arms so that when the first part is applied to the edge of a door, the tips 13 and 15 will be deformed outwardly and due to the natural resiliency of the material from which they are made, will press inwardly against the two faces of the door so as to form an at least substantially moisture proof seal with said faces so as at least to hinder if not totally prevent passage of moisture to the end face of the door.

On the inner face of the arm 11, a plurality of gripper fins 17 extending inwardly at about 60° towards the base 7 of the part are provided, these fins being principally to assist in holding the part 1 on the edge of the door. It is preferred that the fins 17 are on the inner arm 11 only because even when collapsed they will have some bulk thereby holding the arm 11 a short distance from the door face. This could have an undesirable effect if they were provided on the outer arm 9, both visually and for sealing purposes.

The outer face of the base 7 is provided with a channel 19 for mating engagement with the crossbar of a T-sectioned projection 21 on the second seal part 3 and with an overhang 23 arranged to overlie one arm of the crossbar of the projection 21 when the two parts are assembled together. The projection 21 extends outwardly from the base 25 of the second part 3 and upstanding from one edge region of the base 25 is a resiliently deformable first arm 27, both the inner and outer faces of which are generally arcuate and extend in towards the centre line 29 of the seal and merge at a tip 31. Extending upwardly from the other edge region of the base 25 is a second inwardly directed arm 33 which is shorter than the first arm 27 and, being thinner than the arm 27, is more easily deformed. In use, the arm 33 is arranged to be deformed inwardly towards the centre line 29 so as to form a seal with the inwardly directed face of the portion of the container defining the door opening when the door is closed, whereas the tip 31 of the arm 27 is arranged to deform slightly outwardly and form a seal with the outwardly directed face of the portion of the container defining the door opening.

It is preferred that the first portion 1 is formed of a plastics material so that the four corners of the seal (for a rectangular door) can be mitred and connected together in known manner, for example with a glue or solvent, whereas it is preferred that the second part 3 be formed of a rubber material so that the four corners can be mitred if necessary and then connected together by means of a moulding operation. The main reason for making the part 3 of rubber is that the part 1 can be made very slightly undersize so that after it has been fitted to the door, the part 3 can be stretched and applied onto the part 1 and the natural resiliency of the rubber will then hold the seal tightly on the door.

It will of course be appreciated that the two parts 1 and 3, due to their generally mating groove 19 and projection 21 will, to a certain extent, remain connected together. However, so as positively to connect the two parts together the third part 5 is required and this is preferably formed from a plastics generally U-shaped extrusion having a base 35, a first short upstanding arm 37 and a second long upstanding arm 39 generally parallel to the arm 37. The arm 37 is arranged to form a tight fit within a groove 41 formed in a corner region of the first seal part 1 and as shown is provided with a plurality of gripper fins 43 to assist in retaining the arm 37 in the groove 41. If desired, the part 5 may be a dual durometer extrusion, in which case at least some of the fins 43 would preferably be formed of a softer material than the remainder of the part. The arm 39 is arranged to overlie the exposed outer face portion 45 of the base 7 and to extend over the other part of the head of the T-shaped projection 21 on the seal part 3 so as to extend towards the centre line 29 of the seal in the opposite sense to the overhang 23. It will thus be appreciated that the part 5, due to its arm 37 engaging the groove 41, will effectively be locked to the part 1 and by virtue of its arm 39 and the overhang 23 engaging beneath the edge portions of the head of the projection 21 located in the groove 19, the part 3 will be positively attached to the part 1.

By providing an at least two-part door seal, it is possible to replace the container sealing part, i.e. the second part 3, very simply whenever this becomes damaged. Since this part provides the outer perimeter of the seal, it is most prone to damage and of course even when it is removed for replacement, the part 1 will remain on the door and provide an effective door seal. In other words, the edge of the door is sealed from the elements at all times thus giving the door a considerably longer life than known seals.

Figure 2:
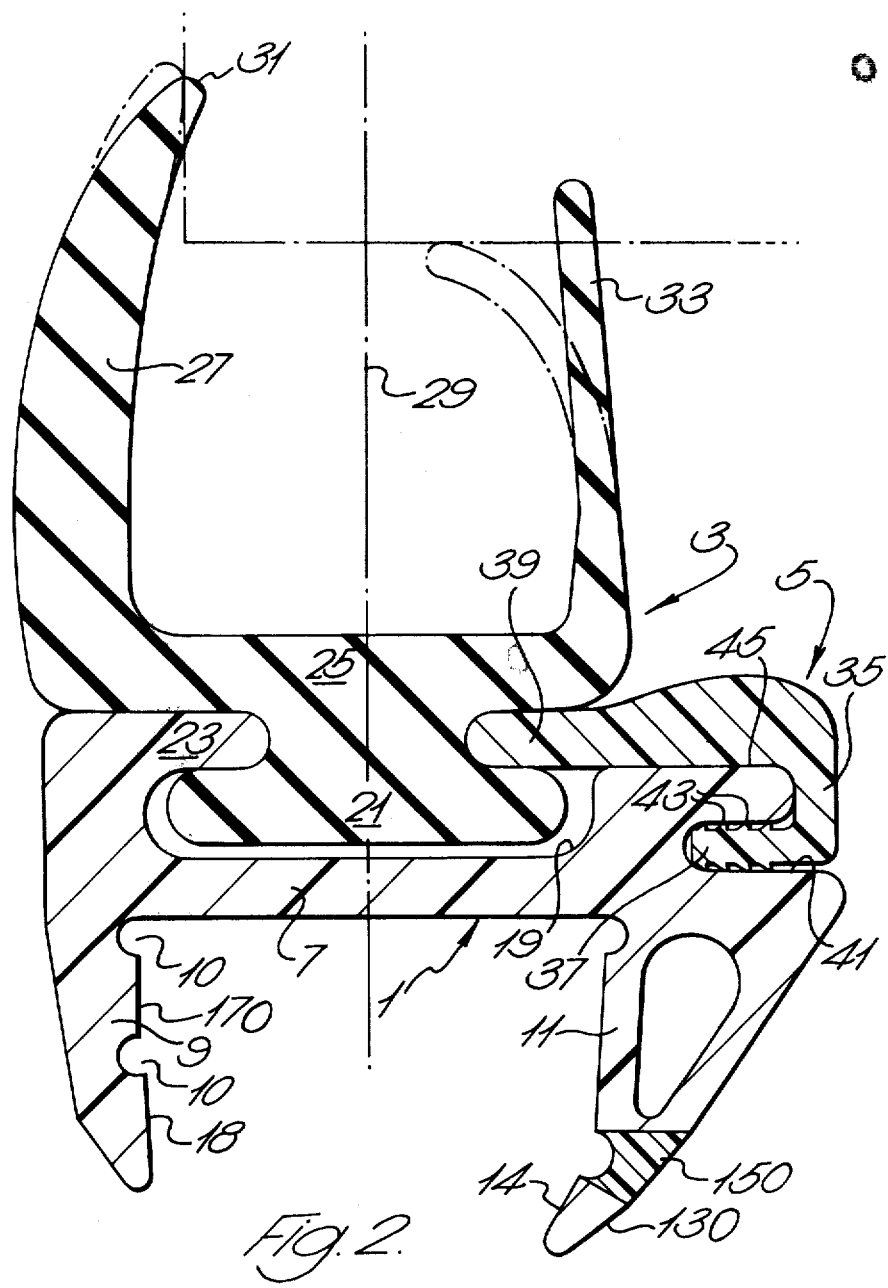

Referring to FIG. 2, the seal construction is similar to that of FIG. 1, and like parts are identified by the same reference numerals. A tip portion 130 of the arm 11 is, in this construction, formed of the same resiliently deformable plastics material as the remainder of the arm, but is connected to the main portion of the arm 11 by means of a portion 150 of softer plastics material. The inner face 14 of the tip 130 is inclined inwardly towards the arm 9 so that the tip can take up any manufacturing tolerances in the edge of the container door to which the portion 1 is to be attached. Because the external arm 9 is formed of the harder plastics material, it gives a positive precise location on the container door and its inner face is preferably formed with two internal grooves 10 to accommodate adhesive by means of which the part 1 is connected to the door edge. For a similar purpose, an internal portion 170 of the inner face of the arm 9 is spaced inwardly of an outer portion 18 of the arm 9 to ensure that there is sufficient space for the adhesive in the event that the part 1 is a very tight fit on the door.

The arm 11 is shown as being hollow. This is not essential and if a greater space between the arms 9 and 11 is required, the arm 11 need not be hollow. It is intended that the tip portion 130 will always be pressed against the inner face of the door with a considerable force due to the resiliency of the portion 150, thus causing the inner face of the arm 9 to bear tight against the outer surface of the door.

It will be appreciated that the second part 3 could be connected to the first part 1 by a third part of a construction other than that specifically described above and that the various materials from which the parts 1, 3 and 5 are extruded could be different from those specifically described. It is however, important that the parts 1 and 3 are formed of resiliently deformable material.

Further advantages of making the seal portion 3 of rubber, e.g. ethylene propylene diene monomer, are that it can withstand temperatures of approximately −40° C. to +60° C. and it is resilient to ultra violet light. Also, it can be stretched into place, kinking is eliminated and the sealing properties of the first part 1 are increased once it has been applied to the part 3.

From the foregoing it will be appreciated that there are considerable advantages in having a three part container door seal.

What is claimed is:

1. A three part seal construction for a container door, said seal construction comprising a first resiliently deformable part of a predetermined generally channel sectioned shape for application to the edge portions of a container door so that when fitted to the door it will form a seal with said edge portions to preclude the passage of moisture to the door edges, a second part having a base for connection to the first part and at least one first resiliently deformable sealing arm upstanding from an edge region of said base for sealing engagement with a portion of the container surface around the door opening, first interengaging means for releasably securing said base of said second part to said first part, and second interengaging means comprising a third part separate from said first and second parts for releasably securing said first and second parts together.

2. A seal construction as claimed in claim 1 wherein said first part is extruded from a resiliently deformable plastics material and has a base and a pair of arms extending therefrom giving said first part a generally rectangular U-shaped cross section, and including inwardly directed tips on said arms of said first part to form seals with peripheral edge portions of the front and rear faces of said door.

3. A seal construction as claimed in claim 2 wherein said plastics extrusion is a dual durometer extrusion with said tips being of a softer material than the remainder of said extrusion.

4. A seal construction as claimed in claim 2 wherein at least one gripper fin is provided on at least one of said arms of said U-shaped first part, said at least one fin extending inwardly from the inner face of said at least one arm towards said base of said U-shaped first part so as to assist said first part automatically to grip on the container door.

5. A seal construction as claimed in claim 4 wherein there are a plurality of said gripper fins on said at least one arm, which fins are of softer material than the remainder of said first part.

6. A seal construction as claimed in claim 5 wherein said fins are formed of the same soft material as said tips.

7. A seal construction as claimed in claim 1 including means provided on the outer face of said base of said channel sectioned first part for mating engagement with said base of said second part.

8. A seal construction as claimed in claim 1 wherein an outer face of said channel sectioned first part is cut away to form an overhang portion overlying a portion of said base of said second part.

9. A seal construction as claimed in claim 1 wherein said second part is extruded from a resiliently deformable material.

10. A seal construction as claimed in claim 9 wherein said resiliently deformable material is rubber.

11. A seal construction as claimed in claim 1 wherein said second part includes a second sealing arm spaced from said first sealing arm to give said second part a generally U-shaped cross-section.

12. A seal construction as claimed in claim 11 wherein said second sealing arm is shorter than said first sealing arm and is more easily deformed than said first sealing arm.

13. A seal construction as claimed in claim 8 wherein a T-sectioned projection is provided on the outer face of said base of said second part, and said portion of said base of said second part comprises the crossbar of said T-sectioned projection engaging beneath said overhang portion on said first part.

14. A seal construction as claimed in claim 1 wherein said third part comprises an extrusion, said third part having a first portion which engages with said first part of said seal construction and a second portion which engages with said second part of said seal construction.

15. A seal construction as claimed in claim 1 wherein said second part of said seal construction has a T-shaped projection and said third part is resiliently deformable and is of generally U-shaped cross-section with a first arm of said U-shaped third part engaging in a groove extending lengthwise of said first part of said seal construction and a second arm of said U-shaped third part engaging beneath a portion of the crossbar of said T-shaped projection.

16. A seal construction as claimed in claim 15 wherein said second arm of said third part is longer than said first arm of said third part.

17. A seal construction as claimed in claim 15 wherein outwardly extending gripper fins are provided on said first arm of said third part on at least one of its faces to improve the grip of said first arm with said first part.

18. A seal construction as claimed in claim 17 wherein said third part is a dual durometer extrusion with at least some of said gripper fins being formed of a softer material than the remainder of said third part.

19. A seal construction as claimed in claim 15 wherein said generally channel shaped first part has two arms, and a tip portion of at least one of said arms is connected to the remainder of said one arm by a portion formed of a softer material than the remainder of said one arm.

20. A seal construction as claimed in claim 19 wherein said tip portion has an inner surface which is inclined inwardly towards the opposite arm of said first part so that said tip portion can take up manufacturing tolerances.

* * * * *